United States Patent [19]

Baker

[11] 4,332,265
[45] Jun. 1, 1982

[54] COLLAPSIBLE TENT FOR TRUCK BEDS

[76] Inventor: Robert L. Baker, 4815 E. Santa Ana, Fresno, Calif. 93726

[21] Appl. No.: 153,158

[22] Filed: May 27, 1980

[51] Int. Cl.³ .............................................. B60P 3/34
[52] U.S. Cl. .................................................. 135/3 A
[58] Field of Search ............ 135/3 A, 1 A, 4 A, 7.1 A

[56] References Cited

U.S. PATENT DOCUMENTS 2,957,482 10/1960 Tomek ............................ 135/3 A X
3,375,836 4/1968 Domeneghetti ..................... 135/1 A
3,466,082 9/1969 Branch ............................. 135/1 A X

FOREIGN PATENT DOCUMENTS 2038159 6/1972 Fed. Rep. of Germany ..... 135/3 A
391325 4/1933 United Kingdom ............... 135/1 A
1005316 9/1965 United Kingdom .................... 135/3

Primary Examiner—J. Karl Bell
Attorney, Agent, or Firm—Huebner & Worrel

[57] ABSTRACT

A collapsible tent adapted for erection on a truck bed or the like having a plurality of rigid elongated tubular elements providing endwardly disposed sockets, studs engaged in the sockets releasably mounting the elements on the bed and interconnecting them in a frame which defines a chamber on the bed, a cover fitted downwardly over the frame having lower edges secured to the bed to tension the cover over the frame holding the sockets and studs in engagement.

4 Claims, 11 Drawing Figures

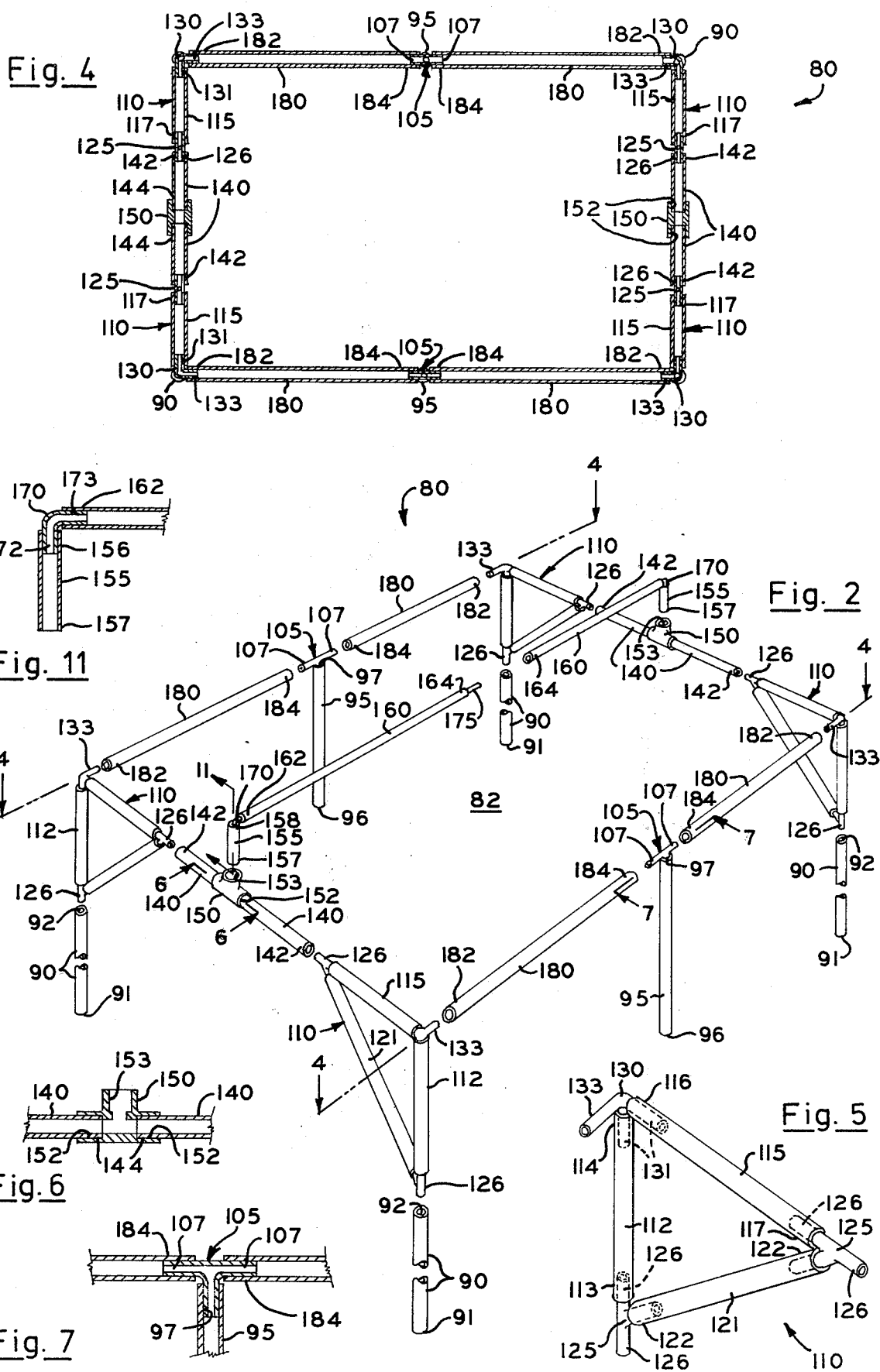

COLLAPSIBLE TENT FOR TRUCK BEDS

BACKGROUND OF THE INVENTION

1. Field of the Invention

The present invention relates to a collapsible tent for truck beds and the like, and more particularly to such a tent which is rapidly and conveniently mounted on and dismounted from such a bed, is light in weight, is low in cost, and is particularly adapted for use with small pickups and four-wheel drive vehicles.

2. Description of the Prior Art

The prior art includes well-known portable enclosures, such as tents and camper shells, for mounting on a truck bed. Insofar as is known to the applicant, none of these prior art devices meet the need for an enclosure which is mounted on a truck bed for use and yet can be readily dismounted and compactly stowed for transportation to a campsite or the like.

Prior art tents are relatively expensive and slow to erect since they generally include elements secured to the ground to support the roof and upper portions of the walls of the tent. These elements also increase the bulk of a tent when it is in a collapsed configuration for stowage. Prior art camper shells for the bed of a pickup truck or the like utilize the bed for support, but, heretofore, substantial portions of these shells have been permanently assembled. The shells thus must be relatively bulky to provide sufficient interior room and, as a result, project upwardly and outwardly from the bed. Such shells therefore cannot be used when vehicles, typically four-wheel drive vehicles, are operated on narrow roads with limited vertical and horizontal clearances due to trees, rocks, and the like. Even where limited clearances are not a problem, the bulky structure of such a shell results in its being relatively heavy and expensive and thus not well suited for occasional use or for use where it is desired to mount and dismount the shell frequently.

It has long been recognized as highly advantageous to provide a collapsible tent for a truck bed or the like which can be readily erected when an enclosure is needed for living quarters and then readily dismantled and stowed when the truck is on the road. It has also been recognized as especially advantageous if the tent is relatively low in cost, light in weight, and even suited for operation of the vehicle at moderate speeds with the tent in an erect configuration.

PRIOR ART STATEMENT

In conformance with 37 C.F.R. §1.97 and §1.98, the applicant states that he is not aware of any prior art other than that just described which is relevant to the patentability of the present invention.

SUMMARY OF THE INVENTION

It is an object of the present invention to provide an improved collapsible tent for truck beds and the like.

Another object is to provide such a tent which is rapidly and simply erected.

Another object is to provide such a tent which is of minimal weight and cost.

Another object is to provide such a tent adapted for use in rugged terrain by four-wheel drive vehicles.

Another object is to provide such a tent having a frame adapted for compact stowage and for minimal obstruction of the bed when dismantled.

A further object is to provide improved elements and arrangements thereof in such a tent which is simply constructed of readily available materials, durable, and fully effective in carrying out its intended purposes.

BRIEF DESCRIPTION OF THE DRAWINGS

FIG. 2 is an exploded perspective view of a frame utilized in the tent of FIG. 1.

FIG. 4 is a horizontal section of the frame in its assembled configuration taken from the position of line 4—4 of FIG. 2.

FIG. 5 is a perspective view at a scale larger than that of FIG. 2 showing a triangular corner element of the frame.

FIG. 6 is a somewhat enlarged fragmentary vertical section of the frame taken on line 6—6 of FIG. 2.

FIG. 7 is a somewhat enlarged fragmentary vertical section of the frame taken on line 7—7 of FIG. 2.

FIG. 11 is a vertical section taken on line 11—11 of FIG. 2, at an enlarged scale.

DESCRIPTION OF THE PREFERRED EMBODIMENT

Figure 1:
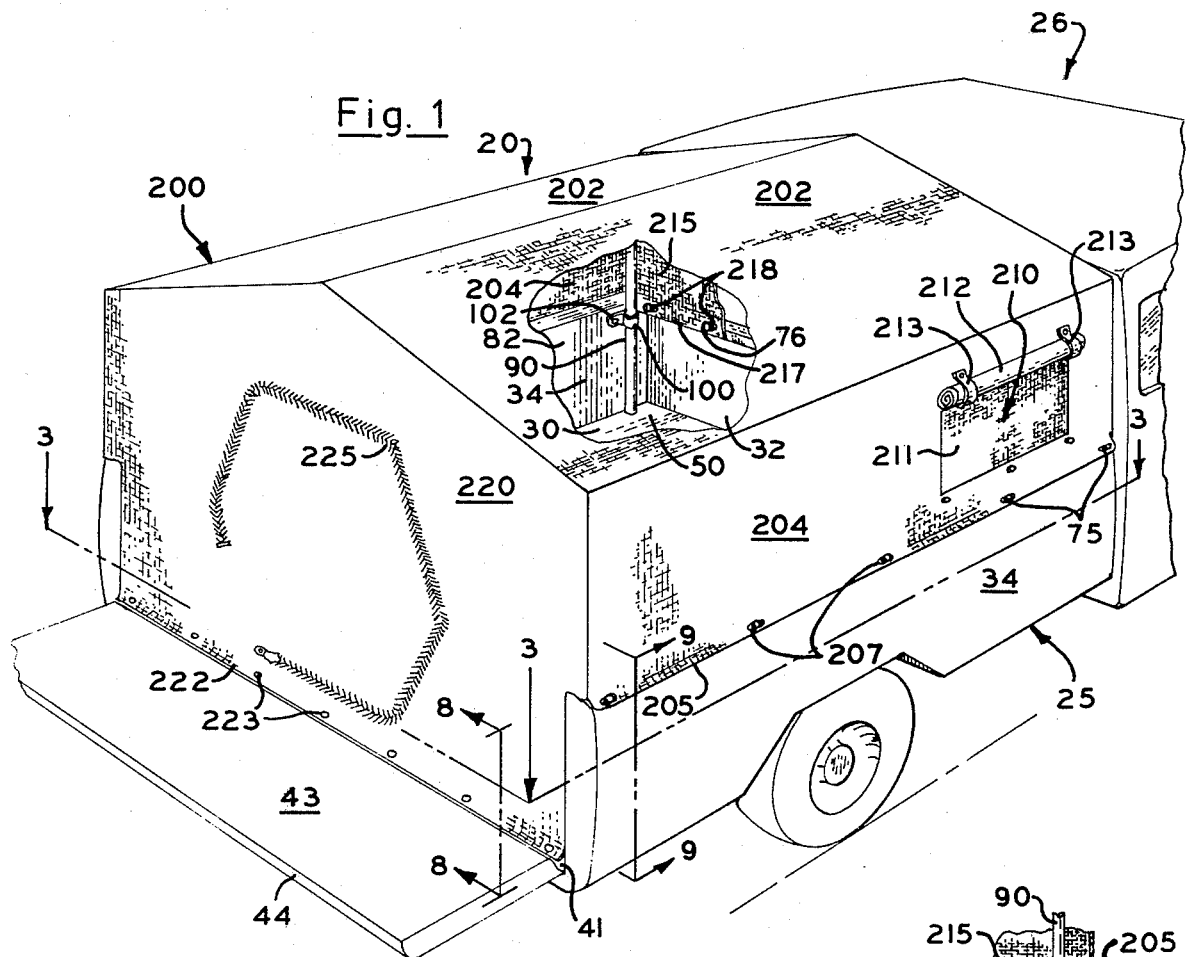
FIG. 1 is a perspective view of a collapsible tent embodying the principles of the present invention mounted on the bed of a truck with portions of the truck fragmentarily represented and with a portion of the tent broken away to show the interior.
Figure 8:
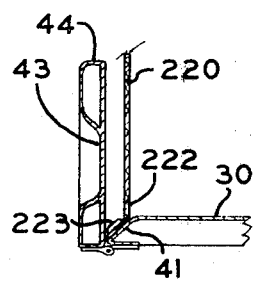
FIG. 8 is a fragmentary vertical section of the tent and the bed taken on line 8—8 of FIG. 1.

Referring with greater particularity to the drawings, in FIG. 1 is shown a collapsible tent 20 for truck beds and the like embodying the principles of the present invention. The tent is depicted in its operating environment mounted, as best shown in FIGS. 1, 2, 8, and 9, on the bed 25 of a fragmentarily represented truck 26.

The bed 25 of the truck is rectangular, having a generally planar floor 30, a transversely extending forward wall 32, and a pair of parallel side boards 34 extended rearwardly from the ends of the wall individually along the longitudinally extending sides of the bed. Each side board includes a centrally disposed wheel well which provides an upwardly disposed surface 36 within the bed upwardly of the floor. The wall and the side boards have individual upper edges 39 which lie in a substantially common plane parallel to the floor. The floor has a rearward edge 41 which extends between the rearward ends of the side boards. The bed is provided with a rectangular tailgate 43 depicted in a lowered position in FIGS. 1 and 3 and in a raised position in FIG. 8. The tailgate has an edge which is hingedly mounted at the rearward edge of the bed and an opposite edge 44. When the tailgate is in its raised position, it extends parallel to the forward wall between the rearward ends of the side walls with the opposite edge in the plane of the upper edges 39.

The bed 25 thus has a pair of forward corners 50 disposed individually at the intersections of the forward wall with the side boards and a pair of rearward corners 52 disposed individually at the intersections of the rearward edge 41 of the floor 30 with the boards.

Figure 10:
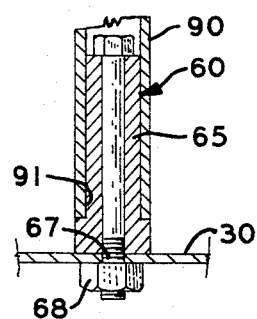
FIG. 10 is a vertical section taken on line 10—10 of FIG. 9 at an enlarged scale showing a bed stud utilized in the tent with associated elements of the tent and bed fragmentarily represented.
Figure 9:
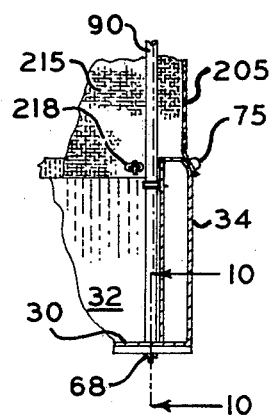
FIG. 9 is a fragmentary vertical section of the tent and bed taken on line 9—9 of FIG. 1.
Figure 3:
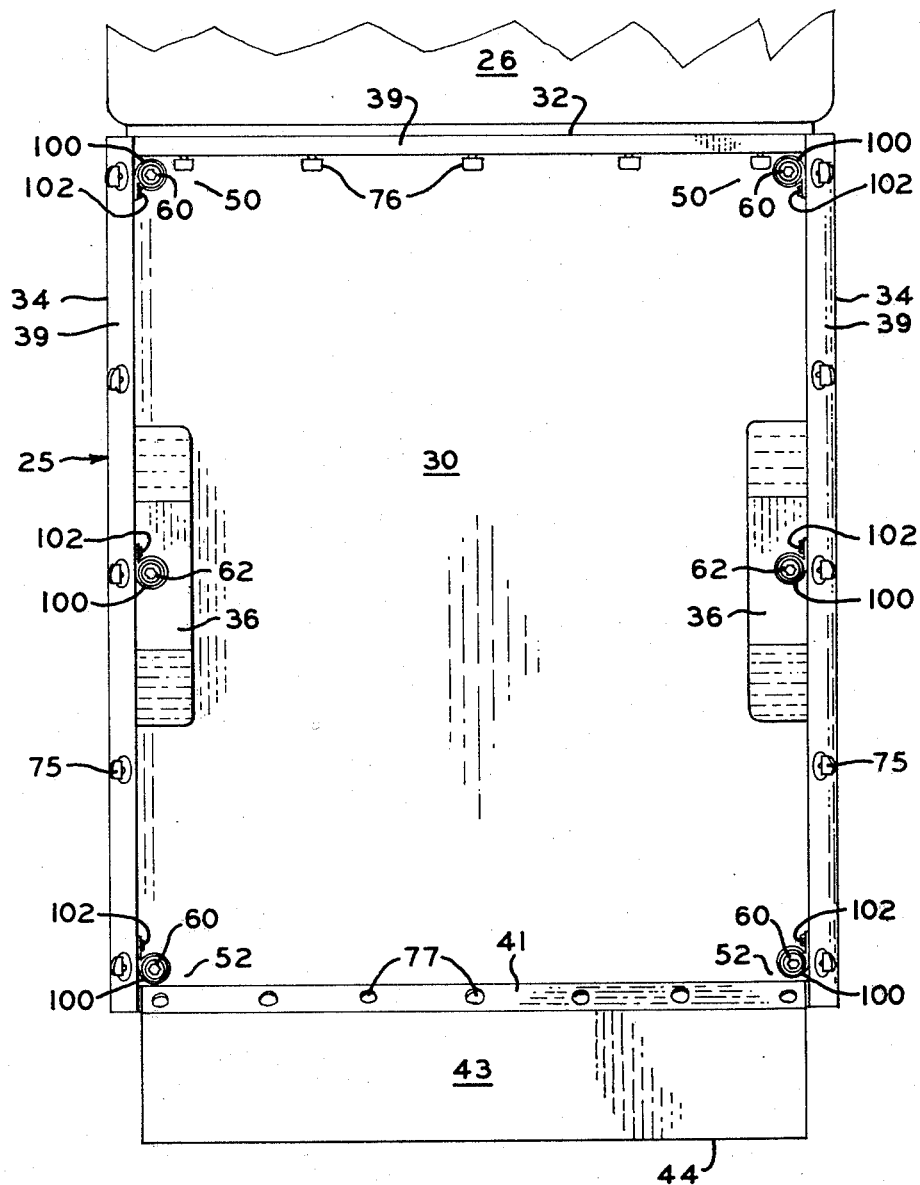
FIG. 3 is a somewhat enlarged plan view of the bed taken from the position of line 3—3 of FIG. 1.

The tent 20 includes four bed studs 60, shown in FIGS. 3, 9, and 10, individual to the corners 50 and 52 and mounted on the floor 30 adjacent to their corresponding corners. The tent further includes a pair of center studs 62 individually mounted on the upper wheel well surface 36. These six studs are substantially identical and each has a body 65 which is constructed from a conventional pipe plug and is provided with a coaxial bore aligned with a bore 67 in the corresponding corner or wheel well surface of the bed. Each stud includes a bolt assembly extended through these aligned bores to secure the stud rigidly to the bed with the stud extended axially upwardly from the corresponding bore in the bed.

The tent 20 is provided with a plurality of male connectors, shown in FIGS. 1, 3, 8, and 9, disposed in four horizontal rows 75, 76, and 77. The row 75 is mounted on each of the side boards 34 adjacent to its upper edge 39 and outwardly of the bed. Another row 76 is mounted on the forward wall 32 adjacent to its upper edge and inwardly of the bed. The connectors in these rows preferably are of a well-known type having a rotatable head. The remaining row 77 extends in rearwardly facing disposition along the rearward edge 41 of the bed and the connectors in this rows, suitably, are of the well-known snap connector type.

The tent 20 includes an articulated frame 80 which is best shown in FIGS. 2 and 4. The frame selectively can be assembled to define, together with the floor 30, wall 32, and side boards 34, a chamber 82 disposed generally upwardly on the bed or, alternatively, the frame can be disassembled for compact stowage. The frame is constructed of a plurality of elongated tubular elements of standard polyvinyl chloride pipe. Preferably, the studs 60 and 62, as well as other studs and tubular elements subsequently described, are also constructed of this material which is advantageous for the purposes of the present invention in that engaging elements constructed of it can be conveniently bonded together in rigid engagement where required, and adequate strength achieved in a lightweight structure. Obviously, any other suitable material may be utilized.

The frame 80 includes four upright corner tubes 90 individual to the corner studs 60 and best shown in FIGS. 2 and 9. Each tube has a lower end which provides a socket 91 releasably fitted downwardly over the corresponding stud. The frame is thereby mounted on the bed 25 with the corner tubes adjacent to the corresponding corners 50 or 52. These tubes have upper ends disposed substantially in the same horizontal plane which is spaced substantially upwardly from the edges 39. These upper ends provide individual upwardly disposed sockets 92 of these tubes. The frame has a pair of upright center tubes 95, best shown in FIG. 2, which are similar to the corner tubes, having lower sockets 96 individually releasably fitted over the center studs 62 and upper socket 97. These upper sockets lie in a horizontal plane spaced upwardly from the plane of the upper sockets of the corner tubes.

The tent 20 includes six clamps 100, shown in FIGS. 1, 3, and 9. These clamps are individual to the tubes 90 and 92 and are disposed in inwardly adjacent relation to the upper edges 39 of the side boards 34. Each clamp is of well-known construction and includes a strap which encircles the corresponding tube at a point just below the adjacent edge of the side board so that the clamp is upwardly spaced from the lower socket 91 or 96 of the corresponding tube. Each clamp is provided with a screw 102 extending through the strap and into screw-threaded engagement with the adjacent side board to connect the tube releasably thereto.

The frame 80 has a pair of studs 105, shown in FIGS. 2 and 7, of inverted T-shape. Each stud has a downwardly extended arm bonded in rigid engagement in the upper socket 97 of the center tube and has a pair of projections 107 which extend oppositely horizontally from the socket in a direction parallel to the side boards 34. One of these projections thus extends toward one of the forward corners 50 while the other projection extends toward one of the rearward corners 52.

The frame has four triangular corner members 110, shown in FIGS. 2, 4, and 5. The members are of tubular construction and are individually related to the corner tubes 90. Each corner member includes a vertical tube 112 aligned with the corresponding corner tube and having a lower end, which provides a downwardly disposed socket 113 in juxtapositioned alignment with the upper socket 92 of the corner tube, and an upper end 114. The length of the vertical tube is substantially equal to the difference in elevation between the plane of these upper sockets and the plane of the upper sockets 97 of the center tubes 95. The corner members have individual horizontal tubes 115 which are substantially equal in length to their vertical tubes. Each horizontal tube has an end 116 adjacent to the upper end of the corresponding vertical tube. The horizontal tube is extended from the vertical tube in a direction toward the transversely opposite corner tube to an end which provides a horizontally disposed corner socket 117. The pair of these corner sockets at the forward corners 50 are thus disposed in spaced facing relation transversely of the bed, and the pair of these sockets at the rearward corners 52 are disposed in a substantially identical relation. Each corner member includes a diagonal tube 121 having a pair of opposite ends 122. One of these opposite ends is adjacent to the socket of the vertical tube and the other of these opposite ends is adjacent to the socket of the horizontal tube.

Each triangular member 110 includes a pair of Y-shaped angle studs 125 each having a pair of axially aligned, oppositely facing, cylindrical projections 126 and having a lateral cylindrical projection which is disposed at an angle of substantially 45° to the axis of the aligned projections. The laternal projections of the angle studs are individually received in the ends 122 of the diagonal tube 121 so that one angle stud of each triangular member is disposed upwardly and centrally of the bed from the other angle stud. One of the aligned projections of each lower angle stud is received in the adjacent downwardly disposed socket 113, and one of these projections of each upper angle stud is received in the adjacent horizontally disposed socket 117. The projections received in these sockets are bonded in rigid engagement therewith. The projections axially opposite those received in the downwardly disposed sockets are slidably fitted in the upper sockets 92 of the corner tubes and the corresponding studs are thereby individually releasably engaged in the upper sockets.

Each triangular member 110 has a corner stud 130 having a pair of end cylindrical projections 131 extended axially at 90° to each other and individually received in the respective ends 114 and 116 of the tubes 112 and 115. These projections are bonded in rigid engagement with the corresponding ends of the tubes.

Each corner stud also has a cylindrical, horizontal corner projection 133 whose axis extends longitudinally of the bed 25 through the intersection of the axes of the end projections and normal to the plane of these axes. The corner projection thus extends horizontally and is disposed in 90° angular relation to the corresponding corner socket 117. When the triangular members are engaged in the corresponding sockets 92 and are disposed so that their horizontal tubes 115 extend individually transversely inwardly of the bed from those sockets, the pair of the corner projections adjacent to one of the side boards 34 are aligned longitudinally of the bed and the pair of corner projections adjacent to the other of the side boards are similarly aligned. Since the vertical tubes 112 have a length equal to the difference in elevation of the sockets 92 and 97, each corner projection is also aligned with one of the projections 107 of the stud 105 in the transversely corresponding center tube 95 and each corner projection faces this one of the projections.

The frame 80 includes four substantially identical transversely elongated tubes 140 which are shown in FIGS. 2, 4, and 6, and are individual to the corner members 110. Each tube has an end adjacent to the corresponding corner member and this end provides a socket 142 disposed in juxtapositioned alignment with the corresponding corner socket 117. The socket of the tube is slidably fitted to the one of the aligned projections 126 of the stud 125 opposite the projection of the stud which is received in the corresponding corner socket. The stud is thus releasably engaged in the socket of the transverse tube. Each transverse tube has an end 144 which is opposite its end providing the socket 142 and is inwardly disposed from this socket in relation to the bed 25 when this socket is releasably engaged with the corresponding stud. The length of the transversely disposed tubes is such that the inwardly disposed ends of the pair of these tubes at the forward corners 50 are in spaced facing relation transversely of the bed, and the corresponding ends of the pair of these tubes at the rearward corners 52 are disposed in similar relation.

The frame 80 includes a pair of T-shaped tubular connectors 150 each having a pair of opposite horizontally disposed sockets 152 and an upwardly disposed central socket 153. The horizontal sockets of one of these connectors receive the inwardly disposed ends 144 of the pair of transverse tubes 140 at the forward corners 50 of the bed 25 and the corresponding sockets of the other connectors receive the inwardly disposed ends of the other pair of the transverse tubes. These ends of the tubes are bonded in rigid engagement with the corresponding sockets.

The frame 80 has a pair of substantially identical, elongated struts 155, shown in FIG. 2, individual to the central sockets 153. The struts have downwardly disposed ends 157 which are slidably fitted in the corresponding one of these central sockets so that the struts are releasably engaged therein. Each strut has an end opposite its downwardly disposed end which provides an upwardly disposed strut socket 158.

As shown in FIG. 2, the frame 80 includes a pair of substantially identical, axially aligned, elongated ridge tubes 160 extending horizontally and longitudinally of the bed 25 between the struts 155. The ridge tubes are individually related to the struts, and each ridge tube has an end 162 disposed in spaced facing relation to the socket 158 of the corresponding strut. The ridge tubes have individual ends opposite the struts which provide a pair of sockets 164 disposed centrally of the bed in juxtaposed alignment.

The frame 80 is provided with a pair of L-shaped tubes 170 which individually interconnect the upwardly disposed strut sockets 158 with the adjacent ends 162 of the ridge tubes 160. Each L-shaped tube has a downwardly disposed ridge projection 172 and a horizontally disposed ridge projection 173 which are extended in right-angular relation. The downwardly disposed projection is bonded in rigid engagement in the corresponding strut socket, and the horizontally disposed projection is similarly engaged with the corresponding one of the ends of the ridge tubes.

A tubular coupling 175 of the frame 80 interconnects the juxtapositioned aligned sockets 164 of the ridge tubes 160. One end of the coupling is bonded in rigid engagement with one of these sockets while its other end is slidably fitted in the other of the sockets so that the coupling is releasably engaged with this other socket.

The frame 80 has four longitudinally elongated tubes 180, shown in FIGS. 2, 4, and 7, individual to the triangular corner members 110. Each of these tubes has an end providing a socket 182 slidably fitted to the corner projection 133 of the corresponding corner member and has an opposite end providing a socket 184 slidably fitted over the one of the projections 107 of the T-shaped studs 105 which faces this corner projection. Each longitudinal tube is, therefore, releasably engaged with the studs received in its sockets.

The tent 20 has a unitary cover, indicated generally by the numeral 200 and best shown in FIG. 1, fitted downwardly over the frame 80 and upwardly covering the chamber 82. The cover has a pair of rectangular roof panels 202 extended transversely and downwardly in opposite directions from the ridge tubes 160 to the longitudinal tubes 180. The cover has a pair of side flaps 204 extended individually and substantially vertically downwardly from the roof panels to the transversely corresponding one of the upper edges 39 of the side boards 34. Each side flap is thus disposed in parallel relation to the transversely opposite sides of the rectangular bed and extends upwardly from the transversely corresponding one of these sides. Each side flap has a lower edge 205 extending in overlapping relation along the upper edge of the corresponding side board and outwardly juxtapositioned thereto. Each lower edge is provided with a row 207 of eyes individually corresponding to and fitted over the row 75 of connectors on the corresponding side board. The lower edge is thus releasably connected to the bed and is secured thereto by rotating the heads of the connectors.

Each side flap 204 has a window 210 of well-known construction. The window is provided with a flexible screen 211 and an upwardly rollable rain flap 212 which can be secured in rolled configuration by straps 213.

The cover 200 has a forward flap 215 which extends transversely of the bed 25 in upwardly parallel relation to its forward wall 32 from the upper edge 39 of this wall to the roof panels 202 and between the side flaps 204. The forward flap has a lower edge 217 which extends in inwardly overlapping, juxtapositioned relation along the upper edge of the wall. This lower edge is provided with a row of eyes 218 which connect the edge to the row 76 of connectors on the forward wall.

The cover has a rearward flap 220 which has a lower edge 222 disposed in overlapping parallel relation to the rearward edge 41 of the floor 30. The rearward flap extends upwardly from its lower edge between the side boards 34 and the side flaps 204 to the roof panels 202. This lower edge is provided with a row of female snap connectors 223 which individually engage the connectors in the one of the rows 77 thereof along the rearward edge and thereby releasably connect this edge with the lower edge. It will be noted that the rearward flap of the cover is disposed inwardly of the bed from the tailgate 43 when the tailgate is in its raised position. The rearward flap is preferably provided with a zipper fastener 225 which is disposed in an incompletely closed loop configuration so as to provide a door for the tent when the fastener is opened.

The panels 202 and the flaps 204, 215, and 220 are constructed of any suitable fabric or other sheet material and are dimensioned and proportioned so that, when the lower edges 205, 217, and 222 are connected to the bed 30, the cover is tensioned over the frame 80 and compresses its tubular elements 90, 95, 140, 155, 160, and 180 inwardly of the chamber 82 thereby establishing compressive forces lengthwise of these tubes. As a result, the releasably engaged sockets and studs associated with the ends of these tubes are urged axially into engagement so that the frame is maintained in its assembled configuration and so that the sockets 113 are held in downward engagement with the bed studs 60 which are compressed in their respective sockets.

OPERATION

The operation of the described embodiment of the present invention is believed to be clearly apparent and is briefly described at this point. Initially, the studs 60 and 62 are mounted on the bed 25 by the bolt assemblies 68 and the clamps 100, and the rows 75, 76, and 77, of connectors are mounted on the bed in their respective positions. These elements of the tent 20 occupy relatively little space and do not increase the horizontal and vertical clearances required for passage of the truck 26 in rugged terrain so that these elements may remain in their mounted positions without limiting the mobility of the truck or taking up a significant amount of cargo space in the bed. However, if desired, the studs and clamps can be easily removed by loosening, respectively, the bolt assemblies and the screws 102.

When the truck 26 is to travel at relatively high speed or where the clearances are limited, the cover 200 is disconnected from the bed 25 by releasing the rows 75, 76, and 77 of connectors from their respective rows 207 and 218 of eyes or the row 223 of connectors. The cover is then detached from the frame 80 and folded in a compact configuration for stowage. The tubular elements of the frame are no longer endwardly compressed, and the frame is then disassembled by separating these elements where they are releasably interconnected and where the tubes 90 and 95, respectively, are releasably connected to the studs 60 and 62.

When the truck 26 is driven to a location where it is desired to use the tent 20 in its assembled configuration, the tent is erected on the bed. The frame 80 is first erected and the cover 200 is then assembled over the frame in tensioning relation thereto and in enclosing relation to the chamber 82. Since the tent is constructed of fabric and plastic materials which are relatively light in weight, the erection of the tent requires no exertion, and, since these materials are relatively inexpensive, the tent is low in cost. The tent is rapidly and simply erected since the frame is assembled by slidably engaging its releasably interconnected elements and since these elements are maintained in their assembled configuration by installation of the cover without any additional manipulation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A collapsible tent adapted to be erected on a truck bed or the like comprising:
    A. an articulated frame including a plurality of rigid, elongated elements adapted to be assembled to define a chamber and disassembled for compact stowage;
    B. stud and socket means releasably engageable to interconnect the elements in chamber defining assembly and releasable by outward movement relative to the chamber to free the elements from assembled relation; and
    C. a cover of flexible sheet material fitted downwardly over the frame having a lower edge adapted for connection to such a bed to tension the cover downwardly against the frame releasably to hold the stud and socket means in engagement against outward movement relative to the chamber.

2. A collapsible tent for truck beds and the like comprising:
    A. a plurality of rigid elongated elements having endwardly disposed sockets;
    B. studs engaged in the sockets interconnecting the elongated elements in a frame defining a chamber, the studs including studs which are releasably engaged in their respective sockets and studs which are rigidly engaged in their respective sockets, the releasable studs and their respective sockets being so disposed as to be held in releasable engagement by compressive forces directed inwardly of the chamber; and
    C. a flexible cover fitted downwardly over the frame having lower edges releasably connected to the bed with the cover tensioned about the frame compressing the releasable studs in their respective sockets inwardly of the chamber.

3. A collapsible tent for a rectangular truck bed having a pair of forward corners and a pair of rearward corners comprising:
    A. bed studs individual to the corners rigidly mounted on the bed and upwardly extended therefrom adjacent to their respective corners of the bed;
    B. a frame comprising:
        (1) upright tubular elements individual to the bed studs having lower ends providing sockets releasably fitted downwardly over their respective bed studs and upper ends providing upwardly disposed sockets,
        (2) tubular triangular corner elements individual to the upright tubular elements, the corner elements having downwardly disposed sockets in juxtaposed alignment with the upwardly disposed sockets of their respective tubular elements and having a horizontally disposed corner socket and a horizontally extended corner projection in substantially 90° angular relation, the pair of sockets of the forward corner elements being in spaced facing relation transversely of the bed, the pair of sockets of the rearward corner elements being in spaced facing relation transversely of the bed, the pair of projections of one side of the bed being in spaced facing relation longitudinally of the bed, and the pair of projections at the other side of the bed being in spaced facing relation longitudinally of the bed, (3) transverse elongated tubular elements individual to the corner elements having endwardly disposed sockets in juxtaposed alignment with the transversely disposed sockets and opposite inwardly disposed ends in spaced facing relation transversely of the bed, (4) T-shaped tubular elements having opposite horizontally disposed sockets rigidly engaged with the inwardly disposed ends of the transverse tubular elements and upwardly disposed central sockets, (5) elongated tubular strut elements individual to the central sockets having downwardly disposed ends releasably engaged with the central sockets of the T-shaped elements and upwardly disposed strut sockets, (6) L-shaped tubular elements individual to the strut elements having downwardly disposed ridge projections fitted downwardly in the upwardly disposed strut sockets of their respective strut elements and horizontal ridge projections in spaced facing relation longitudinally of the frame, (7) elongated tubular ridge elements having opposite ends individually rigidly interconnected to the horizontal ridge projections and inwardly disposed sockets in juxtaposed alignment, (8) a tubular coupling interconnecting the inwardly disposed sockets of the ridge elements, (9) longitudinal elongated tubular elements individual to the corner elements having endwardly disposed sockets releasably engaged with the longitudinally disposed projections of the corner elements, and

(10) studs interconnecting the pairs of said sockets which are in juxtaposed alignment, said studs being releasably engaged in one thereof to permit disassembly of the frame and being rigidly engaged in the sockets which are in spaced facing relation; and C. a cover fitted downwardly over the frame having lower edges fastened to the bed tensioning the cover over the frame, the releasable studs and their respective sockets being so disposed as to be endwardly compressed to maintain engagement by the cover tensioned thereover.

4. A collapsible tent for truck beds and the like comprising

A. a frame of rigid elongated elements separable for compact stowage and assemblable to define a substantially right parallelpiped having upright rigid elements at its corners, parallel longitudinal rigid elements, and parallel transverse rigid elements;

B. stud and socket means releasably connecting the corner elements to the bed, the longitudinal elements to the corner elements in parallel spaced relation to the bed, and the transverse elements to the corner elements in parallel spaced relation to the bed, the individual stud and socket means being axially telescopic between extended disengagement for release of their respective elements for compact stowage and interfitted contracted engagement for interconnection of their respective rigid elements, the stud and socket means interconnecting the corner elements and the bed in axially erect attitude, interconnecting the longitudinal elements and the corner elements in axial alignment with the longitudinal elements, and interconnecting the transverse elements and the corner elements in axial alignment with the transverse elements; and C. a cover of flexible sheet material fitted downwardly over the frame and tensioned axially to contract the stud and socket means interconnecting the corner elements and the bed, axially to contract the stud and socket means interconnecting the longitudinal elements and the corner elements, and axially to contract the stud and socket means interconnecting the transverse elements and the corner elements.

* * * * *